US012673897B2

(12) United States Patent
Becquet

(10) Patent No.: US 12,673,897 B2
(45) Date of Patent: Jul. 7, 2026

(54) HYDRAULIC BINDER COMPOSITION

(71) Applicant: BOSTIK SA, Colombes (FR)

(72) Inventor: Jérémy Becquet, Venette (FR)

(73) Assignee: BOSTIK SA, Colombes (FR)

(*) Notice: Subject to any disclaimer, the term of this patent is extended or adjusted under 35 U.S.C. 154(b) by 910 days.

(21) Appl. No.: 17/600,213

(22) PCT Filed: Apr. 2, 2020

(86) PCT No.: PCT/EP2020/059422
§ 371 (c)(1),
(2) Date: Sep. 30, 2021

(87) PCT Pub. No.: WO2020/201436
PCT Pub. Date: Oct. 8, 2020

(65) Prior Publication Data
US 2022/0204405 A1 Jun. 30, 2022

(30) Foreign Application Priority Data

Apr. 3, 2019 (FR) .................................. FR1903568

(51) Int. Cl.
| | |
|---|---|
| *C04B 28/14* | (2006.01) |
| *C04B 28/04* | (2006.01) |
| *C04B 28/06* | (2006.01) |
| *C04B 111/00* | (2006.01) |
| *C04B 111/32* | (2006.01) |
| *C04B 111/60* | (2006.01) |

(52) U.S. Cl.
CPC ............ *C04B 28/04* (2013.01); *C04B 28/065* (2013.01); *C04B 28/14* (2013.01); *C04B 2111/00672* (2013.01); *C04B 2111/32* (2013.01); *C04B 2111/60* (2013.01)

(58) Field of Classification Search
CPC ....... C04B 28/04; C04B 28/065; C04B 28/14; C04B 2111/00672; C04B 2111/32; C04B 2111/60; C04B 2103/0007
See application file for complete search history.

(56) References Cited

U.S. PATENT DOCUMENTS

| | | | | |
|---|---|---|---|---|
| 3,997,353 A | * | 12/1976 | Chervenka, Jr. ...... | C04B 28/065 106/695 |
| 4,190,454 A | * | 2/1980 | Yamagisi .............. | C04B 28/065 106/695 |
| 5,186,746 A | * | 2/1993 | Freeman ................... | C09D 7/68 428/452 |
| 5,591,256 A | * | 1/1997 | Freeman ................. | C01B 33/26 428/452 |
| 10,112,870 B2 | * | 10/2018 | White ..................... | C04B 14/14 |
| 2006/0118006 A1 | * | 6/2006 | Amathieu ............. | C04B 28/065 106/611 |
| 2007/0074642 A1 | * | 4/2007 | Amathieu ............. | C04B 28/065 106/695 |
| 2014/0121302 A1 | * | 5/2014 | Brien .................... | C04B 28/065 524/8 |
| 2014/0238274 A1 | * | 8/2014 | Bullerjahn ................ | C04B 7/26 106/815 |
| 2016/0102021 A1 | * | 4/2016 | Bullerjahn ................ | C04B 7/43 106/737 |
| 2017/0113970 A1 | | 4/2017 | Mahiaoui et al. | |

FOREIGN PATENT DOCUMENTS

| | | | | | |
|---|---|---|---|---|---|
| CN | 100393662 C | * | 6/2008 | .......... | C04B 28/065 |
| EP | 1609770 A2 | * | 12/2005 | .......... | C04B 14/042 |
| EP | 2735555 A1 | * | 5/2014 | .......... | C01B 33/20 |
| FR | 2372125 A1 | | 6/1978 | | |
| FR | 3021046 A1 | | 11/2015 | | |
| JP | H0769698 A | * | 3/1995 | | |
| JP | 2007297250 A | * | 11/2007 | .......... | C04B 14/02 |
| WO | WO-2017212045 A1 | * | 12/2017 | .......... | C04B 22/10 |

OTHER PUBLICATIONS

Daxad® Additives by GEO Specialty Chemicals for Plastics (specialchem.com) (Year: 2024).*
Machine translation JP 2007297250A (Year: 2007).*
CN100393662C Machine Translation (Year: 2008).*
JP2018002587 Machine translation, published 2018, yoshifumi et al.*
WO2016193642 Machine translation, published 2016, Brigandat et al.*
ISA/EP; International Search Report and Written Opinion for International Patent Application No. PCT/EP2020/059422 dated May 25, 2020, 11 pages.
"EN 197-1 Cement—Part 1: Composition, specifications and conformity criteria for common cements" European Standard, CEN: European Committee for Standardization, Jun. 2000, 29 pages.

* cited by examiner

*Primary Examiner* — Smita S Patel
(74) *Attorney, Agent, or Firm* — Rimon P.C.; Allyn B. Elliott

(57) ABSTRACT

The present invention relates to a hydraulic binder composition comprising:
at least one Portland cement;
at least one amorphous calcium aluminate;
calcium sulfate;
at least one alkaline salt S chosen from $K_2CO_3$, $Rb_2CO_3$, $Cs_2CO_3$ and mixtures thereof; the composition being characterized in that the mass ratio of alkaline salt(s) S to amorphous calcium aluminate(s) ranges from 0.01 to 0.2.

13 Claims, No Drawings

HYDRAULIC BINDER COMPOSITION

CROSS-REFERENCE TO RELATED APPLICATIONS

This application is a U.S. National Stage application of International Patent Application No. PCT/EP2020/059422, filed on Apr. 2, 2020, which claims the benefit of French Patent Application No. FR1903568, filed on Apr. 3, 2019.

FIELD OF THE INVENTION

The present invention relates to a hydraulic binder composition.

The invention also relates to the use of the hydraulic binder composition for preparing mortars or concretes.

TECHNOLOGICAL BACKGROUND

Hydraulic binders typically consist essentially of mineral compounds and are characterized by their ability to set and harden irreversibly when brought into contact with water.

Calcium aluminates are one of the main constituents of the high-alumina cements commonly used to manufacture binders, concretes or mortars. In particular, two types of high-alumina cements are distinguished: crystalline calcium aluminate cements and amorphous calcium aluminate cements.

Calcium aluminate cements are well known for their rapid reaction with calcium sulfates and the formation of ettringite. Ettringite enables rapid consumption of water enabling hardening and a rapid increase in cohesion of the mortars. In addition, ettringite is expansive, advantageously making it possible to compensate for the shrinkage of the mortars. The formation of ettringite results in particular from nucleation and growth from species present in solution. The chemical reaction for formation of ettringite is as follows:

$$6Ca^{2+}+2Al(OH)_4^-+4OH^-+3SO_4^{2-}+26H_2O \rightarrow Ca_6[Al(OH)_6]_2 \cdot 3SO_4 \cdot 26H_2O$$

The use of amorphous high-alumina cement causes a rapid rise in the concentration of calcium ions due to their better dissolution in water compared to crystallized high-alumina cements. However, this saturation with calcium ions gives rise to delayed ettringite formation which can lead to post-hardening swelling of the product which may result in the appearance of cracks and its destruction.

There is therefore a need for novel hydraulic binder compositions which avoid, at least in part, at least one of the abovementioned drawbacks.

More particularly, there is a need for novel hydraulic binder compositions which make it possible to avoid or reduce post-hardening swelling while maintaining good mechanical properties of the mortar or concrete obtained.

DESCRIPTION OF THE INVENTION

The present invention relates to a hydraulic binder composition comprising:
 at least one Portland cement;
 at least one amorphous calcium aluminate;
 calcium sulfate;
 at least one alkali metal salt S chosen from $K_2CO_3$, $Rb_2CO_3$, $Cs_2CO_3$ and mixtures thereof;
said composition being characterized in that the alkali metal salt(s) S:amorphous calcium aluminate(s) weight ratio ranges from 0.01 to 0.2.

Within the context of the invention, the term "hydraulic binder" is understood to mean a finely ground mineral material which, mixed with water, forms a paste which sets and hardens as a result of the reaction and hydration process and which, after hardening, retains its strength and stability even under water (standard NF EN 197-1 of April 2012).

The hydraulic binder composition according to the invention has at least one of the following advantages:
 makes it possible to reduce or prevent the post-hardening swelling (or expansion) of the mortars or concretes obtained;
 enables hardening and rapid drying;
 enables users to be able to quickly use the wet mortar or concrete prepared by mixing the dry mortar or concrete composition with water, in particular in a time of less than 5 minutes, preferably from 2 to 5 minutes. Such an advantage proves to be advantageous in the preparation of a screed, for example;
 makes it possible to reduce or even prevent the formation of lumps during the mixing with water step, thus limiting the formation of visual defects which can be unacceptable for customers in the field of floor coatings;
 good mechanical properties in compression.

Hydraulic Binder Composition

According to a preferred embodiment, the binder composition is characterized in that the alkali metal salt(s) S:amorphous calcium aluminate(s) weight ratio ranges from 0.01 to 0.1, advantageously from 0.02 to 0.06, more advantageously still from 0.03 to 0.05, for example said weight ratio is approximately 0.04.

The weight content of alkali metal salt(s) S in the composition may range from 0.1% to 0.8% by weight, preferably from 0.15% to 0.7% by weight, and advantageously from 0.20% to 0.65% by weight relative to the total weight of the composition.

Preferably, the alkali metal salt S is $K_2CO_3$.

The calcium sulfate may be chosen from anhydrous calcium sulfate (or anhydrite) (generally denoted anhydrous $CaSO_4$), calcium sulfate dihydrate (or gypsum) ($CaSO_4 \cdot 2H_2O$), calcium sulfate semihydrate (hemihydrate or bassanite), and mixtures thereof.

The calcium sulfate may be of natural or synthetic origin.

The calcium sulfate may be in the form of a powder with a median diameter d50 varying from 3 to 50 micrometers, preferably from 3 to 20 micrometers.

The term "median diameter d50" is understood to mean a diameter such that 50% of the particles by weight have a size smaller than said diameter.

The particle size analysis of the mean diameter d50 of the calcium sulfate particles can be carried out by laser particle size analysis.

Preferably, the calcium sulfate which can be used according to the invention comprises at least 90% by weight, and more preferentially at least 95% by weight of anhydrous calcium sulfate relative to the weight of calcium sulfate. More preferably still, the calcium sulfate is anhydrous calcium sulfate (anhydrite).

The weight content of calcium sulfate in the composition may range from 1% to 30% by weight, preferably from 5% to 25% by weight, more preferentially still from 10% to 22% by weight, and advantageously from 15% to 20% by weight relative to the total weight of the composition.

Within the context of the invention, and unless otherwise mentioned, the term "amorphous calcium aluminate" is understood to mean a calcium aluminate comprising a content of at least 60% of amorphous phase and therefore a degree of crystallization of less than or equal to 40% of crystalline phase. Preferably, the amorphous calcium aluminate comprises a content of at least 65% of amorphous phase, more preferentially still at least 70%, or even preferably at least 75%, advantageously at least 80%, and more advantageously still at least 85%. More preferably still, the calcium aluminate comprises a content of at least 90%, and advantageously of at least 95%, or even a content of at least 98% of amorphous phase.

The total weight content of amorphous calcium aluminate(s) in the composition may range from 0.1% to 50% by weight, preferably from 0.5% to 20% by weight, preferably from 0.5% to 10% by weight, preferably from 0.5% to 8% by weight, and more preferentially still from 1% to 6% by weight relative to the total weight of the composition.

The crystalline phases present in the amorphous calcium aluminate may be $CaO \cdot Al_2O_3$, $CaO \cdot 2Al_2O_3$, $3CaO \cdot Al_2O_3$, $11CaO \cdot 7Al_2O_3 \cdot CaF_2$, $12CaO \cdot 7Al_2O_3$ or $3CaO \cdot 3Al_2O_3 + CaSO_4$ or a mixture thereof.

Preferably, the calcium aluminate comprises, by weight relative to its total weight:

from 30% to 60%, advantageously from 40% to 55% by weight of calcium oxide CaO (C);

from 20% to 50%, advantageously from 30% to 50% by weight of alumina $Al_2O_3$ (A);

from 1% to 10% by weight of silica $SiO_2$;

from 0.05% to 8% by weight of iron oxide $Fe_2O_3$.

Preferably, the C/A molar ratio of the calcium aluminate ranges from 0.6 to 3, preferably from 1 to 2.

The calcium aluminate may comprise other compound(s) in a content ranging from 0% to 5% by weight relative to the total weight of the calcium aluminate, such as for example titanium oxide ($TiO_2$) or magnesia (MgO).

The calcium aluminate may have a Blaine specific surface area measured according to standard NF EN196-6 ranging from 2000 to 8000 $cm^2/g$, preferably from 3000 to 7000 $cm^2/g$.

In the context of the invention, the term "Blaine specific surface area" denotes the specific surface area of a pulverulent solid compound, expressed in $cm^2$ per gram of solid, measured by the air permeametry method (or Blaine method) described in standard NF EN 196-6 of April 2012.

The calcium aluminate can be obtained chemically, for example by a melting process followed by a quenching process. A process for preparing amorphous calcium aluminate is for example described in FR 3 021 046.

There are also commercially available calcium aluminates.

The hydraulic binder composition may comprise one or more crystalline calcium aluminate(s). Crystalline calcium aluminates have been known for a long time and are typically obtained by a melting process followed by slow cooling or by sintering.

They are for example described by Kopanda et al. in the publication "Production Processes, Properties and Applications for Calcium Aluminate Cements", Alumina Chemicals Science and Technology Handbook, American Ceramic Society (1990), pp 171-181.

Various products containing crystalline calcium aluminates are commercially available. Mention may be made, for example, of Ciment Fondu® from Kerneos, or Secar®51 from Kerneos.

The expression "Portland cement" denotes without distinction any blended cement as defined in the EN 197-1: 2000 standard, such as the mixtures of Portland cement or the pozzolanic blended cements that may comprise, alone or in combination, fly ash, blast furnace slags, and also natural or calcined pozzolans, metakaolin and limestone fillers.

The Portland cement can be chosen from CEM I Portland cements, CEM II Portland cements, CEM III Portland cements, CEM IV Portland cements, CEM V Portland cements, and mixtures thereof. The CEM I to CEM V Portland cements are defined in particular by standard EN 197-1: 2000.

The Portland cement may comprise:

at least the following crystallized mineralogical phases:

tricalcium silicates and dicalcium silicate ($3CaO \cdot SiO_2$ and $2CaO \cdot SiO_2$—denoted respectively $C_3S$ and $C_2S$);

tetracalcium ferroaluminate ($Al_2O_3 \cdot Fe_2O_3 \cdot 4CaO$—denoted $C_4AF$);

and optionally tricalcium aluminate ($Al_2O_3 \cdot 3CaO$—denoted $C_3A$);

in contents such that the crystallized mineralogical phases $C_2S$ and $C_3S$ represent at least two thirds of the weight of the weight of Portland cement;

and optionally magnesium oxide (MgO).

According to one embodiment, the Portland cement contains blast-furnace slag or fly ash.

Preferably, the Portland cement is a CEM I 52.5 N Portland cement, a CEM I 52.5 R Portland cement, a CEM I 42.5 R Portland cement, or a CEM I 42.5 N Portland cement.

The total content of Portland cement(s) in the hydraulic binder composition may vary from 10% to 80% by weight, preferably from 40% to 75% by weight, and advantageously from 60% to 75% by weight relative to the total weight of the hydraulic binder composition.

The hydraulic binder composition is typically in the form of a powder, and can be obtained by simple mixing of the ingredients.

Preferably, the hydraulic binder composition is devoid of agents capable of forming foam (foaming agents). Examples of such agents may be oxidants such as percarbonate salts, persulfate salts, perborate salts, permanganate salts, peroxides and aluminum powder. The presence of such compounds is not desired in hydraulic binder compositions that make it possible to reduce or prevent the post-hardening swelling of the mortar or concrete obtained.

According to certain preferred embodiments, the hydraulic binder composition consists of:

at least one Portland cement;

at least one amorphous calcium aluminate;

calcium sulfate;

at least one alkali metal salt S chosen from $K_2CO_3$, $Rb_2CO_3$, $Cs_2CO_3$ and mixtures thereof;

said composition being characterized in that the alkali metal salt(s) S:amorphous calcium aluminate(s) weight ratio ranges from 0.01 to 0.2.

Dry Mortar or Concrete Composition

The present invention also relates to a dry mortar or concrete composition, comprising:

the hydraulic binder composition as defined previously; and at least one aggregate.

The aggregate can be chosen from gravel, chippings, sand, calcium carbonate, dolomite, recycled glass, and mixtures thereof.

Preferably, the aggregate is chosen from sand, calcium carbonate, and mixtures thereof.

The content of aggregate(s) in the dry mortar or concrete composition may range from 15% to 80% by weight, preferably from 30% to 80% by weight, preferentially from 50% to 80% by weight relative to the total weight of said composition.

The dry mortar or concrete composition may comprise at least one additive.

The additives maybe chosen from the group consisting of setting accelerators, setting retarders, antifoaming agents, water repellents, antiaging agents, rheological agents, and mixtures thereof.

These additives are known to those skilled in the art, and the proportion thereof can be adapted by those skilled in the art.

Among the setting accelerators, mention may for example be made of sodium aluminate, sodium silicate, potassium aluminate, aluminum sulfate, lithium sulfate and lithium hydroxide.

Among the setting retarders, mention may for example be made of tartaric acid, citric acid and/or boric acid.

Among the rheological agents, mention may for example be made of cellulose ethers, guar ethers, starch ethers, associative polymers, xanthan gums, welan gums, and mixtures thereof.

The dry mortar or concrete composition may comprise one or more polymers.

The polymer may be in the form of a water-redispersible powder or a solid-liquid dispersion in water (i.e. in the form of an aqueous polymer dispersion).

In the case where the polymer is in the form of a water-dispersible powder, it is preferably chosen from copolymers of vinyl acetate, vinyl versatates and ethylene, and polyvinyl alcohols. Such polymers are for example commercially available from Wacker, Hexion or Elotex.

By way of example, mention may for example be made of:

polymers of vinyl acetate, vinyl versatate and maleic ester, available in powder form under the name Axilat® UP 620E (Hexion);

polymers of vinyl acetate, vinyl versatate and ethylene, available in powder form under the name Elotex® FL3200 or FX3300 (Elotex).

In the case where the polymer is in the form of a solid-liquid dispersion in water, it is preferably chosen from aqueous dispersions of styrene/butadiene, styrene/acrylic, styrene/acrylate, acrylic and vinyl acetate. Such dispersions are commercially available from Rohm & Haas, BASF and Synthomer.

Preferably, the dry mortar or concrete composition comprises:

from 15% to 80% by weight of the binder composition as defined above; and from 15% to 80% by weight of aggregate(s);

from 0% to 5% by weight of additive(s);

from 0% to 10% by weight of polymer(s);

the percentages by weight being relative to the total weight of the dry mortar or concrete composition.

The dry mortar or concrete composition may comprise a total weight content of amorphous calcium aluminate(s), as defined above, ranging from 0.5% to 20% by weight, preferably from 1% to 15% by weight, more preferentially still from 2% to 10% by weight relative to the total weight of the dry mortar or concrete composition. In particular, the dry mortar or concrete composition comprises from 2% to 5% by weight of amorphous calcium aluminate(s) relative to the total weight of said composition.

The total weight content of calcium sulfate, as defined above, in the dry mortar or concrete composition may range from 1% to 30% by weight, preferably from 2% to 20% by weight, and advantageously from 3% to 15% by weight relative to the total weight of said composition.

The total weight content of alkali metal salt(s) S, as defined above, in the dry mortar or concrete composition may range from 0.05% to 0.30% by weight, preferably from 0.10% to 0.20% by weight, and advantageously from 0.12% to 0.18% by weight relative to the total weight of said composition.

Typically, mortars are distinguished from concretes based on the size of the aggregates. For example, in mortars, the aggregates have a relatively small average diameter, for example smaller than that of gravel. On the contrary, concretes typically comprise aggregates which have a larger average diameter, they may for example be gravel or chippings.

Preferably, the dry mortar or concrete composition is a dry mortar composition.

Wet Mortar or Concrete Composition

The present invention also relates to a wet mortar composition or wet concrete composition obtained by mixing the dry mortar or concrete composition as defined above with water, the amount of water being such that the water/solids ratio ranges preferably from 0.12 to 0.40, and more preferentially still from 0.16 to 0.28.

The wet mortar composition may be a smoothing mortar composition (for example a floor coating such as for example a self-smoothing or self-leveling floor coating), a fixing mortar composition (in particular adhesive mortar), a jointing mortar composition, a repairing or filling mortar composition.

Use

The present application relates to the use of the wet mortar or concrete composition for resurfacing and smoothing floors, for forming a leveling or screeding structure, for the smoothing over of floors, for the repair of a concrete structure, for the bedding of elements, and for the bonding and/or jointing of tiles.

The present invention also relates to the use of at least one alkali metal salt S chosen from $K_2CO_3$, $Rb_2CO_3$, $Cs_2CO_3$ and mixtures thereof, in a dry mortar or concrete composition comprising at least one amorphous calcium aluminate, as an anti-swelling agent.

The characteristics of the dry mortar or concrete composition described in detail and also the various embodiments apply to the abovementioned use.

In the context of the invention, the term "between x and y" or "ranging from x to y" means a range wherein the limits x and y are included. For example, the range "between 0% and 25%" notably includes the values 0% and 25%.

The invention is now described in the following exemplary embodiments, which are given purely by way of illustration and should not be interpreted in order to limit the scope thereof.

EXAMPLES

The following ingredients were used:

$K_2CO_3$: Potassium carbonate from Sigma Aldrich with a purity of 99.995%;

OPC 52.5 R: CEM I 52.5 R CE CP2 NF Portland cement, sold by CALCIA (Couvrot) having the following mineralogical composition:

TABLE 1

| C3S | 60-70% |
|---|---|
| C2S | 5-15% |
| C3A cubic | 3-9% |
| C3A ortho. | 5-10% |
| C4AF | 3-9% |
| Gypsum | 2-3% |
| Hemihydrate | 2-3% |
| Blaine surface area | 4650/g |

PP222: Amorphous high-alumina cement (70%) mixed with calcium sulfate (anhydrite) sold by KERNEOS;

VINNAPAS® 5025 L: Redispersible polymer powder—copolymer of vinyl acetate and ethylene;

Casufill A5: natural anhydrite sold by CASEA, the D50 of which is around 5 μm;

PE2LS: sand sold by FULCHIRON INDUSTRIELLE SAS;

S4: crystalline ground silica having a Blaine specific surface area of from 1500 to 2000 $cm^2/g$ sold by FULCHIRON INDUSTRIELLE SAS (D50 between 40 μm and 50 μm);

DC8: pure crystalline natural calcium carbonate, from DEROMEDI CARRIERES;

Tartaric acid L E4: tartaric acid sold by ALTICHEM, having a purity of between 96% and 98%, and a particle size of around 63 μm;

Melflux® VP2631F: superplasticizer sold by BASF (modified polycarboxylic ether);

Agitan® P840: combination of polyglycols on an inorganic support sold by MUNZING;

Tylose® H 300 P2: thickener sold by SE Tylose GmbH & Co (hydroxyethylcellulose).

Example 1: Preparation of Dry Mortar Compositions

The mortar compositions 1 to 4 were prepared by mixing the ingredients at room temperature for around 120 seconds, in the weight proportions given in the following table:

TABLE 2

| | % by weight | | | Composition no. 4 (comparative) |
|---|---|---|---|---|
| | Composition no. 1 | Composition no. 2 | Composition no. 3 | |
| OPC 52.5 R Calcia | 18.8 | 18.8 | 18.8 | 18.8 |
| PP222 | 4.7 | 4.7 | 4.7 | 4.7 |
| Casufill A5 | 3.5 | 3.5 | 3.5 | 3.5 |
| Sand PE2LS | 38.75 | 38.75 | 38.75 | 38.75 |
| Silica S4 | 8 | 8 | 8 | 8 |
| Calcium carbonate DC08 | 24.22 | 24.14 | 24.05 | 24.25 |
| VINNAPAS ® 5025 L | 1.6 | 1.6 | 1.6 | 1.6 |
| $K_2CO_3$ | 0.13 | — | — | — |
| $Rb_2CO_3$ | — | 0.21 | — | — |
| $Cs_2CO_3$ | — | — | 0.30 | — |
| $Na_2CO_3$ | — | — | — | 0.1 |
| Agitan P831 | 0.1 | 0.1 | 0.1 | 0.1 |
| Tylose H300 P2 | 0.1 | 0.1 | 0.1 | 0.1 |
| Melflux VP2631F | 0.1 | 0.1 | 0.1 | 0.1 |
| total | 100% | 100% | 100% | 100% |
| Weight ratio Alkali metal salt(s) ($K_2CO_3$ or $Rb_2CO_3$ or $Cs_2CO_3$ or $Na_2CO_3$ respectively): amorphous calcium aluminate(s) | 0.039 | 0.063 | 0.091 | 0.030 |

Example 2: Preparation of Wet Mortar Compositions

The wet mortar compositions 5, 6, 7 and 8 were prepared from the dry mortar compositions according to example 1.

The mixing ratio used is 24%, that is to say that 100 g of powder (dry mortar composition) are poured into 24 g of water.

The paste is obtained by mechanical mixing using a mixer as described in standard NF EN 1937 of April 2012 by proceeding as follows:

2 kg of powder are mixed in water for 1 minute at slow speed then the wall of the container and also the beater are scraped using a spatula to possibly detach the agglomerated powder, and the paste is mixed again for 1 minute at slow speed.

The paste is then ready to use (time T=0).

TABLE 3

| | Dry mortar composition |
|---|---|
| Wet mortar composition 5 | No. 1 |
| Wet mortar cmposition 6 | No. 2 |
| Wet mortar composition 7 | No. 3 |
| Wet mortar composition 8 (comparative) | No. 4 (composition comparative) |

Example 3: Results

3.1. Observations of Lumps

The wet mortar compositions obtained in example 2 were each spread (50 g) on a glass plate having dimensions of 30 cm×30 cm.

The presence or absence of lumps was observed visually.

The results are recorded in the following table:

TABLE 4

| Wet mortar composition 5 | No lumps |
|---|---|
| Wet mortar composition 6 | No lumps |
| Wet mortar composition 7 | No lumps |
| Wet mortar composition 8 (comparative) | Observation of lumps |

Compositions 5, 6 and 7 (invention) advantageously result in mortars that do not have lumps. This advantageously makes it possible to prevent visual defects that may be unacceptable to customers in the field of floor coatings in particular.

On the other hand, composition 8 results in a mortar that does comprise lumps, which is not acceptable to customers.

3.2. Measurement of Compressive and Flexural Strength

Preparation of the Test Specimens

The wet composition obtained in example 2 (T=0) is poured into the (lightly oiled or greased) mold, using a spatula in order to press it against the walls and the corners of the mold. In order to remove any air bubbles, the mold was lifted up about 1 cm and dropped. The operation was repeated 5 times at each end.

Once the prism was finished, the excess coating was leveled off using a coating knife. 3 bars of 4×4×16 cm (in polystyrene) were prepared. After 24 hours of storage at 23° C. and 50% RH, the prisms were removed from the mold and stored for 28 days at 23° C. and 50% RH.

9

Determination of Flexural Strength at 28 Days:

The bars were placed on the support rollers of the bending device and the loading roller was applied using the compression testing machine after the start of the application of the load.

An average of the results obtained was taken.

TABLE 5

|  | Flexural strength (MPa) |
|---|---|
| Wet mortar composition 5 | 6.7 |
| Wet mortar composition 8 (comparative) | 6.3 |

Determination of Compressive Strength:

The compressive strength was determined by applying a load to the broken portion of the bar which was used to determine the flexural strength.

The specimen was placed between the steel plates, so that the faces of the prism which stuck to the walls of the mold were in contact with the plates over a cross section of 40×40 mm. The top plate was allowed to tilt until the contact between the test specimen and the plate was perfect. The load was applied until the test specimen broke.

TABLE 6

|  | Compressive strength (at 28 days) |
|---|---|
| Wet mortar composition 5 | 30.4 MPa |

3.3. Dimensional Variation

The test is carried out on 3 test specimens having dimensions of 4×4×16 cm equipped with measuring devices at the ends. An average was taken.

Before removal from the mold, the molds were stored at 23° C. and 50% RH. Upon removal from the mold, the distance between the ends was determined and the test specimens were weighed. The test specimens were stored on edge in an environment of (23±2)° C. and (50±5)% RH. The measurements are carried out at the following times: removal from the mold at 24 hours and measurements at 28 days after casting of the test specimens.

The results are presented in the table below:

TABLE 7

|  | Shrinkage (at 28 days) |
|---|---|
| Wet mortar composition 5 | −525 μm/m |
| Wet mortar composition 8 (comparative) | −618.75 μm/m |

Mortar composition 5 advantageously results in a mortar having a limited shrinkage at 28 days (−525 μm/m).

The invention claimed is:

1. A dry mortar or concrete composition comprising:
a hydraulic binder composition comprising:
   at least one Portland cement;
   at least one amorphous calcium aluminate, the at least one amorphous calcium aluminate comprising at least 60% of amorphous phase;
   calcium sulfate;
   at least one alkali metal salt selected from the group consisting of $K_2CO_3$, $Rb_2CO_3$, $Cs_2CO_3$ and mixtures thereof; wherein a weight ratio of the at least one alkali metal salt:the at least one amorphous calcium aluminate ranges from 0.01 to 0.2, and a total weight content of the at least one alkali metal salt in the dry mortar or concrete composition ranges from 0.05% to 0.30% by weight relative to a total weight of the dry mortar or concrete composition;
at least one aggregate; and
one or more polymers chosen from copolymers of vinyl acetate, copolymers of vinyl versatates, copolymers of ethylene, polyvinyl alcohols, styrene/butadiene aqueous dispersions, styrene/acrylic aqueous dispersions, styrene/acrylate aqueous dispersions, acrylic aqueous dispersions and vinyl acetate aqueous dispersions.

2. The dry mortar or concrete composition as claimed in claim 1, comprising:
   from 15% to 80% by weight of the hydraulic binder composition as defined in claim 1;
   from 15% to 80% by weight of the at least one aggregate;
   from 0% to 5% by weight of additive(s); and
   up to 10% by weight of the one or more polymer;
   wherein percentages by weight being relative to a total weight of the dry mortar or concrete composition.

3. The dry mortar or concrete composition as claimed in claim 2, wherein the additives are selected from the group consisting of setting accelerators, setting retarders, antifoaming agents, water repellents, antiaging agents, rheological agents, and mixtures thereof.

4. The dry mortar or concrete composition as claimed in claim 1, wherein the at least one aggregates is selected from the group consisting of gravel, chippings, sand, calcium carbonate, dolomite, recycled glass, and mixtures thereof.

5. The dry mortar or concrete composition as claimed in claim 1, wherein the at least one alkali metal salt:the at least one amorphous calcium aluminate(s) weight ratio ranges from 0.02 to 0.06.

6. The dry mortar or concrete composition as claimed in claim 1, wherein a weight content of the at least one alkali metal salt in the hydraulic binder composition ranges from 0.1% to 0.8% by weight, relative to a total weight of the hydraulic binder composition.

7. The dry mortar or concrete composition as claimed in claim 1, wherein the at least one alkali metal salt is $K_2CO_3$.

8. The dry mortar or concrete composition as claimed in claim 1, wherein the calcium sulfate is chosen from anhydrous calcium sulfate (or anhydrite) (generally denoted anhydrous $CaSO_4$), calcium sulfate dihydrate (or gypsum) ($CaSO_4 \cdot 2H_2O$), calcium sulfate semihydrate (hemihydrate or bassanite), and mixtures thereof.

9. The dry mortar or concrete composition as claimed in claim 1, wherein a weight content of the calcium sulfate in the hydraulic binder composition ranges from 1% to 30% by weight relative to a total weight of the hydraulic binder composition.

10. The dry mortar or concrete composition as claimed in claim 1, wherein the at least one Portland cement is selected from the group consisting of CEM I Portland cements, CEM II Portland cements, CEM III Portland cements, CEM IV Portland cements, CEM V Portland cements, and mixtures thereof.

11. The dry mortar or concrete composition as claimed in claim 1, wherein the at least one Portland cement comprises a CEM I 52.5 N Portland cement, a CEM I 52.5 R Portland cement, a CEM I 42.5 R Portland cement or a CEM I 42.5 N Portland cement.

12. The dry mortar or concrete composition as claimed in claim 1, wherein a total content of the at least one Portland cement varies from 10% to 80% by weight relative to a total weight of the hydraulic binder composition.

13. A wet mortar or wet concrete composition comprising:
a dry mortar or concrete composition comprising
    a hydraulic binder composition comprising:
        at least one Portland cement;
        at least one amorphous calcium aluminate, the at least one amorphous calcium aluminate comprising at least 60% of amorphous phase;
        calcium sulfate;
        at least one alkali metal salt selected from the group consisting of $K_2CO_3$, $Rb_2CO_3$, $Cs_2CO_3$ and mixtures thereof; wherein a weight ratio of the at least one alkali metal salt:the at least one amorphous calcium aluminate ranges from 0.01 to 0.2, and a total weight content of the at least one alkali metal salt in the dry mortar or concrete composition ranges from 0.05% to 0.30% by weight relative to a total weight of the dry mortar or concrete composition;
    at least one aggregate; and
    one or more polymers chosen from copolymers of vinyl acetate, copolymers of vinyl versatates, copolymers of ethylene, polyvinyl alcohols, styrene/butadiene aqueous dispersions, styrene/acrylic aqueous dispersions, styrene/acrylate aqueous dispersions, acrylic aqueous dispersions and vinyl acetate aqueous dispersions; and
water.

\*   \*   \*   \*   \*